United States Patent
Froehlich et al.

(10) Patent No.: US 6,912,923 B2
(45) Date of Patent: Jul. 5, 2005

(54) DEVICE FOR DETERMINING THE TORQUE EXERCISED ON A SHAFT

(75) Inventors: Ekkehart Froehlich, Nordheim (DE); Frank Jerems, Loechgau (DE); Matthias Proft, Siegelsbach (DE); Dirk Rachui, Bietigheim-Bissingen (DE); Roman Schoepe, Bietigheim-Bissingen (DE)

(73) Assignee: Valeo Schalter und Sensoren GmbH, Biegigheim-Bissingen (DE)

( * ) Notice: Subject to any disclaimer, the term of this patent is extended or adjusted under 35 U.S.C. 154(b) by 0 days.

(21) Appl. No.: 10/770,456

(22) Filed: Feb. 4, 2004

(65) Prior Publication Data

US 2004/0194560 A1 Oct. 7, 2004

(30) Foreign Application Priority Data

Apr. 4, 2003 (DE) .......................................... 103 16 124

(51) Int. Cl.[7] .............................. G01L 3/10; G01L 3/12
(52) U.S. Cl. ............................. 73/862.333; 73/862.332; 73/862.331
(58) Field of Search ...................... 73/862.333, 862.332, 73/862.331, 862.334, 862.336, 862.329

(56) References Cited

U.S. PATENT DOCUMENTS 4,984,474 A    1/1991    Matsushima

FOREIGN PATENT DOCUMENTS

| DE | 199 41 860 | 3/2001 |
|---|---|---|
| DE | 102 22 118 | 11/2002 |
| DE | 102 40 049 | 4/2003 |
| FR | 2 821 668 | 9/2002 |

Primary Examiner—Edward Lefkowitz
Assistant Examiner—Lilybett Martir
(74) Attorney, Agent, or Firm—Paul Vincent

(57) ABSTRACT

Device for determining a torque exercised on a shaft, wherein the shaft comprises a first shaft section and a second shaft section, wherein the two shaft sections can be rotated relative to another, with a multi-pole magnetic ring which surrounds the first shaft section and is connected thereto, and a stator holder which is mounted to the second shaft section, wherein two stator elements are mounted to a stator holder and each stator element comprises fingers projecting in an axial or radial direction which are distributed uniformly at least over part of the periphery with gaps between them, wherein the fingers of each stator element are interconnected via a magnetic flux ring, wherein the magnetic flux rings have a mutual separation and a magnetic field sensor is disposed between the magnetic flux rings, wherein at least one magnetic flux concentrator is associated with the magnetic field sensor, wherein the magnetic flux concentrator surrounds the magnetic flux rings.

25 Claims, 7 Drawing Sheets

DEVICE FOR DETERMINING THE TORQUE EXERCISED ON A SHAFT

This application claims Paris Convention priority of DE 103 16 124.4 filed Apr. 4, 2003 the complete disclosure of which is hereby incorporated by reference.

BACKGROUND OF THE INVENTION

The invention concerns a device for determining the torque exercised on a shaft, wherein the shaft comprises a first shaft section and a second shaft section, wherein the two shaft sections can be rotated relative to each other, a multi-pole magnetic ring which surrounds the first shaft section and is connected thereto, and a stator holder which is mounted to the second shaft section, wherein two stator elements are mounted to the stator holder and each stator element has fingers which protrude in an axial or radial direction and which are distributed uniformly at least over part of the periphery and have gaps inbetween, wherein the fingers of each stator element are interconnected via a magnetic flux ring, the magnetic flux rings having a mutual separation, and a magnetic field sensor is disposed between the magnetic flux rings, wherein the magnetic field sensor is associated with at least one magnetic flux concentrator.

U.S. Pat. No. 4,984,474 discloses a torque sensor which is formed substantially from one or more magnetic rings and two stator elements which have a low number of poles. The low pole number has the disadvantage that the signal measured by the sensor is modulated with a waviness when the steering shaft rotates, which can be compensated for only by suitable electronic addition of two signals which are offset by half a pulse width or by flux collecting rings of a completely annular shape. The torque sensor of this design is also relatively sensitive and susceptible to disturbances, since the magnetic flux concentrator is mounted radially outside of the stators. Such a design is also highly susceptible to concentricity tolerances. Finally, the stators comprise spacers formed by separate rings which render the assembly relatively complex.

FR 2,821,668 A1 discloses a device wherein the sensor consists of a discretely formed multi-pole magnetic ring and two nested soft-magnetic stators. These stators have finger-shaped structures on the radial inner side which scan the magnetic poles, and an annular gap on the radial outer side accommodating a stationary magnetic field sensor.

Pole division must be relatively coarse through discrete design of the magnet wheel (pole width 20°) which produces a likewise large linearity range which is not completely utilized since the range of the angle to be measured is only approximately ±3° to 5° due to the required rigidity of the torsion system. The magnetic flux cannot be optimally utilized since the air gap forming the magnetic return is uniformly formed across the entire periphery such that the magnetic flux is distributed over a large surface and is therefore only relatively small at the location of the magnetic field sensor.

Although highly remanent magnets are used, this device shows little sensitivity, and the measuring signal depends greatly on mechanical tolerances such as the width of the air gap where the flux density is measured.

DE 102 22 118 A1 discloses designs with annular flux conductors or magnetic flux collecting rings which are disposed on the outer side of the stators or magnet yokes. The design of the flux conductors disadvantageously leads to great expense and not all influences of radial and axial tolerances of the stators can be compensated for.

Mechanical tolerances in production and assembly of the components conducting the magnetic flux, in particular the stators, cannot be prevented. In all conventional constructions, these tolerances may have a direct effect on the size of the air gaps located in the magnetic circle and therefore a disturbing effect on the measuring signal thereby reducing the accuracy or producing erroneous measurements.

It is therefore the underlying purpose of the invention to further develop a device of the above-mentioned type to reduce the effect of the tolerances on the measuring result.

SUMMARY OF THE INVENTION

This object is achieved in accordance with the invention in that the magnetic flux concentrator surrounds the magnetic flux rings.

The stationary magnetic flux concentrators are designed such that both sides of the magnetic flux rings have flux-collecting surfaces. One single magnetic flux concentrator surrounds the neighboring magnetic flux ring on the inner and also on the outer side instead of on only one side. This inventive design has the great advantage in that tolerances in the flatness or run-out of the magnetic flux ring are averaged. When the inner air gap between magnetic flux ring and magnetic flux concentrator is reduced, the associated outer air gap increases. Since the magnetic flux is guided over both air gaps, both effects are compensated for.

In a preferred further development of the invention, the magnetic flux concentrator surrounds the magnetic flux ring in the shape of a C. The free ends of the magnetic flux concentrator thereby overlap the magnetic flux ring on both sides over a radial length of 20% to 80%, in particular 30% to 50%.

The magnetic flux sensor is preferably disposed between the magnetic flux concentrators. This is advantageous in that the magnetic field sensor is shielded from external influences and is also located close to the magnetic flux concentrators.

The invention is further optimized in that each magnetic flux ring is associated with two or more magnetic flux concentrators. The several magnetic flux concentrators are thereby uniformly arranged over the periphery of the magnetic flux ring which is substantially advantageous in that e.g. when two magnetic flux concentrators are used, a total of two magnetic field sensors can be used thereby producing a redundant signal which also permits signal averaging.

The magnetic flux concentrator can extend over an angular range of 10° to 180°, in particular an angular range of 25° to 90°, of the periphery of the magnetic flux ring.

In one embodiment, the magnetic flux concentrator is arranged in a stationary holder. Additional electronic components, an associated circuit board, plug contacts and/or soldering terminals may be provided in this holder. The holder is formed as separate component and is connected to the stator elements at a suitable location such that the stator elements are movable relative to the holder.

To minimize the play with the magnetic flux rings, the holder is supported on the stator holder via a sliding bearing. This direct contact minimizes the free gaps between magnetic flux rings and magnetic flux concentrators.

If the stator holder can be clamped or locked to a holder ring at the free end of the second shaft section, assembly, repair, and maintenance work are facilitated.

In a preferred embodiment, the magnetic flux concentrators are a stamped, bent component. Production of such stamped, bent components is simple and inexpensive. In an alternative embodiment, the magnetic flux concentrators are a sintered part or a MIM part (metal injection molding part).

Further advantages, features and details of the invention can be extracted from the following description which shows details of particularly preferred embodiments with reference to the drawing. The features shown in the drawing and described in the claims and description may be essential to the invention either individually or collectively in arbitrary combination.

DESCRIPTION OF THE PREFERRED EMBODIMENT

Figure 1:
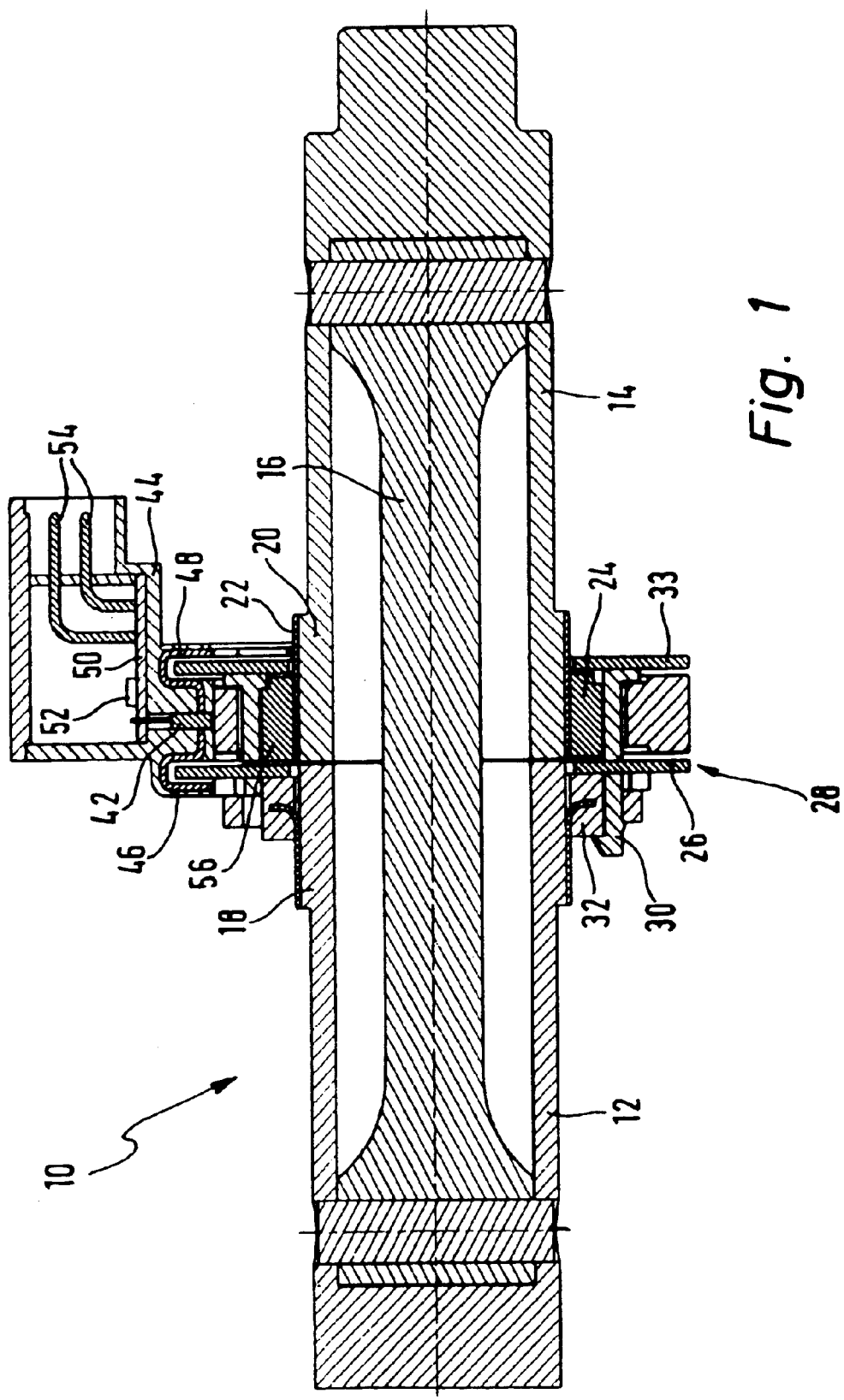
FIG. 1 shows a section through two shaft sections with a device for determining a torque which is mounted to their ends.

FIG. 1 shows a steering shaft, referred to in total with 10, of an automotive vehicle, of which two shaft sections 12 and 14 are shown. The two shaft sections 12 and 14 are connected to each other via a torsion rod spring 16 such that the free facing ends 18 and 20 are rotated relative to each other when a torque is applied to the steering shaft 10. A magnetic ring holder 22 is mounted to the end 20 of the shaft section 14 which carries a multi-pole magnetic ring referred to in total with 24.

This magnetic ring 24 is surrounded by a stator referred to in total with 28 which is mounted to a stator holder 30. This stator holder 30 is mounted to the free end 18 of the shaft section 12, wherein it is locked with a holder ring 32 via a locking device.

Figure 2:
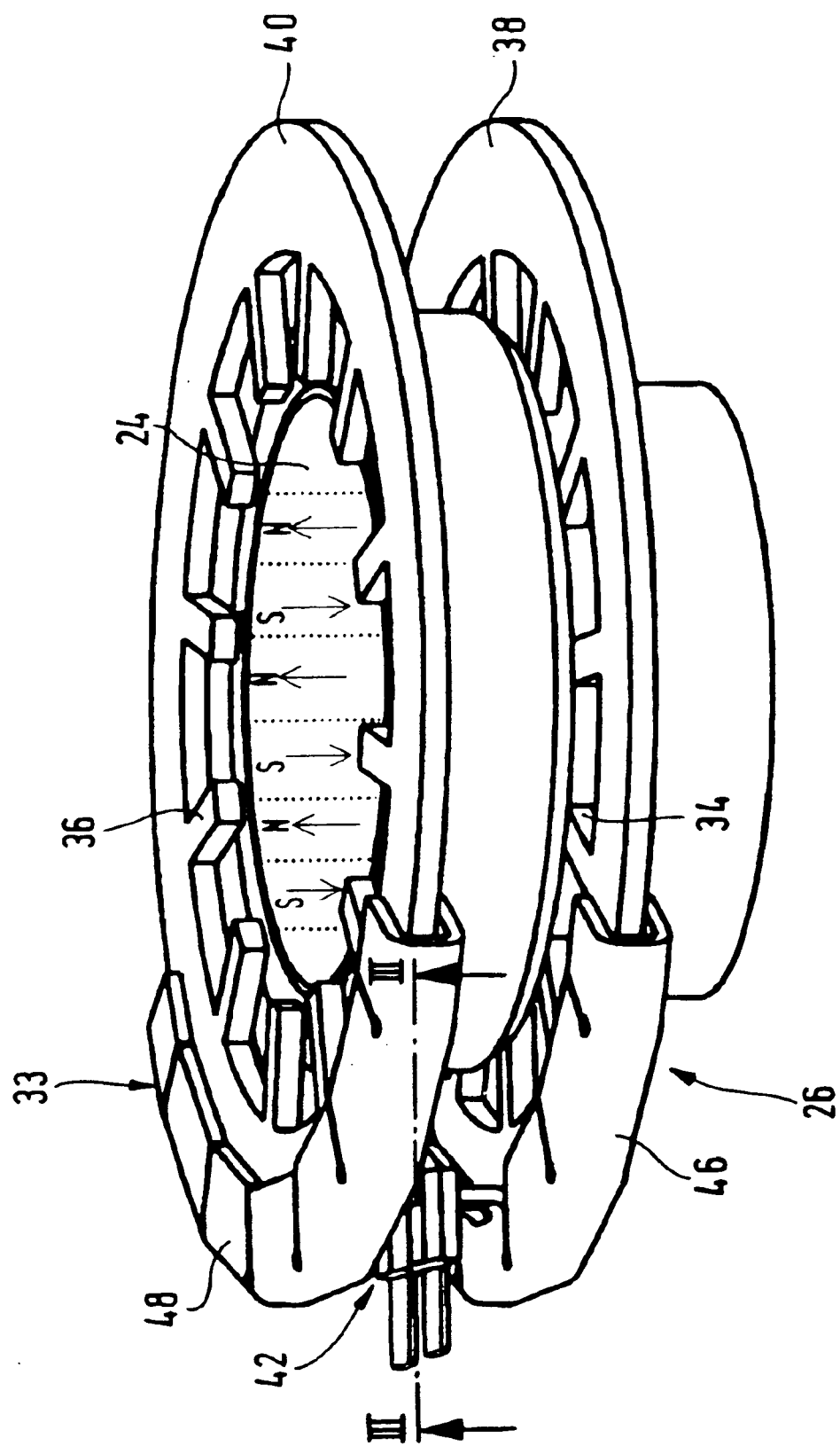
FIG. 2 shows a perspective view of a first embodiment of the inventive device.

A first stator element 26 and a second stator element 33 are mounted to the stator holder 30 and surround the steering shaft 10. The two stator elements 26 and 33 are axially facing and have fingers 34 and 36 (FIG. 2) which project radially inwardly. The fingers 34 and 36 are each carried by a respective magnetic flux ring, 38 and 40, which surrounds the fingers 34 and 36 and guides the magnetic flux induced in each of the fingers 34 and 36 towards a magnetic field sensor 42. This magnetic field sensor 42 is disposed between the two magnetic flux rings 38 and 40 and is carried by a sensor holder 44. FIGS. 1 and 2 clearly show that the magnetic flux ring 38 and also the magnetic flux ring 40 are each surrounded by a magnetic flux concentrator 46 and 48. The two magnetic flux concentrators have a substantially C-shaped design and their free legs extend on both sides of the magnetic flux rings 38 and 40. The two magnetic flux concentrators 46 and 48 are also borne by the sensor holder 44 and are held in their positions relative to the two magnetic flux rings 38 and 40.

FIG. 1 also shows a circuit board 50 for electronic components 52, accommodated in the sensor holder 44 with plug contacts 54 being provided for cable connection. The sensor holder 44 is supported on the stator holder 30 via a sliding bearing 56.

FIG. 2 clearly shows magnetization of the magnetic ring 24 which consists e.g. of a plastic-bonded magnetic material which is injection-molded or compressed. The magnetic ring 24 is axially magnetized in a multipolar fashion, wherein the poles are disposed such that each pole pair is associated with a finger 34 or 36 of a stator element 26 or 33, with the fingers 34 and 36 being located at the transition between one pole pair and another pole pair.

Figure 3:
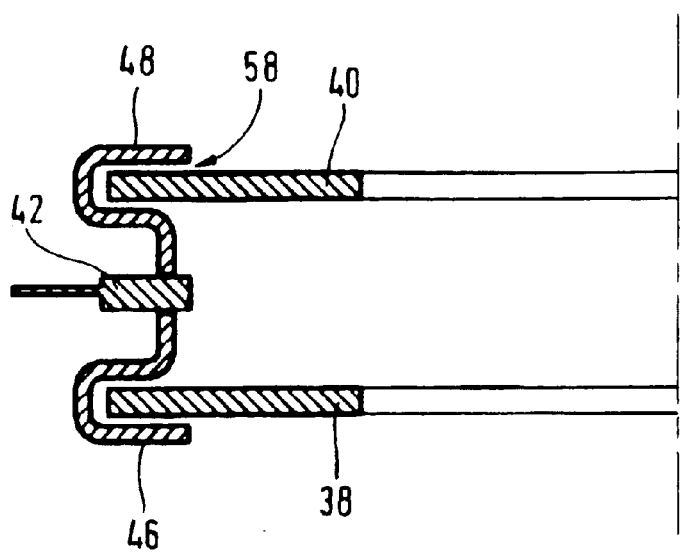
FIG. 3 shows a section III—III in accordance with FIG. 2.

FIG. 3 is a section III—III of FIG. 2 which clearly shows how the two magnetic flux concentrators 46 and 48 extend above the magnetic flux rings 38 and 40 which prevents changes of the air gaps 58 between the magnetic flux concentrators 46 and 48 and the magnetic flux rings 38 and 40 from affecting the measuring result. If one air gap 58 on the magnetic flux ring 38 or 40 is reduced by a wobble motion of the magnetic flux ring 38 or 40, the length of the associated other air gap simultaneously increases, wherein the total magnetic flux collected by the magnetic flux concentrator 46 or 48 remains constant, irrespective of the associated motion of the second magnetic flux ring in the other magnetic flux concentrator.

Figure 4:
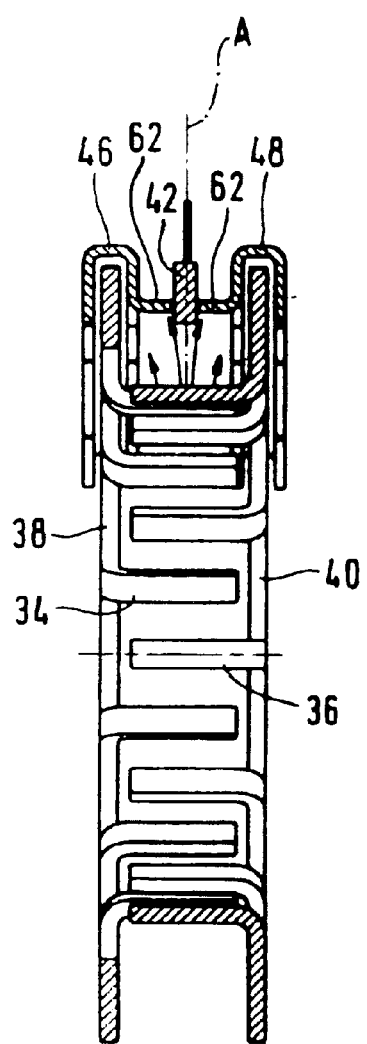
FIG. 4 shows a view on the radially inner part of the two stator elements.

FIG. 4 shows a second embodiment with which the fingers 34 and 36 are bent in an axial direction, wherein the magnetic ring 24 of this embodiment is radially magnetized in a multipolar fashion. Each pole pair is again associated with one finger 34 or 36 and the fingers 34 and 36 are located in the transition region from one pole pair to the other pole pair. In this embodiment, the stator holder 30 can be injection molded to the holder ring 32 together with the stator elements 26 and 33 instead of being locked thereon.

Figure 5:
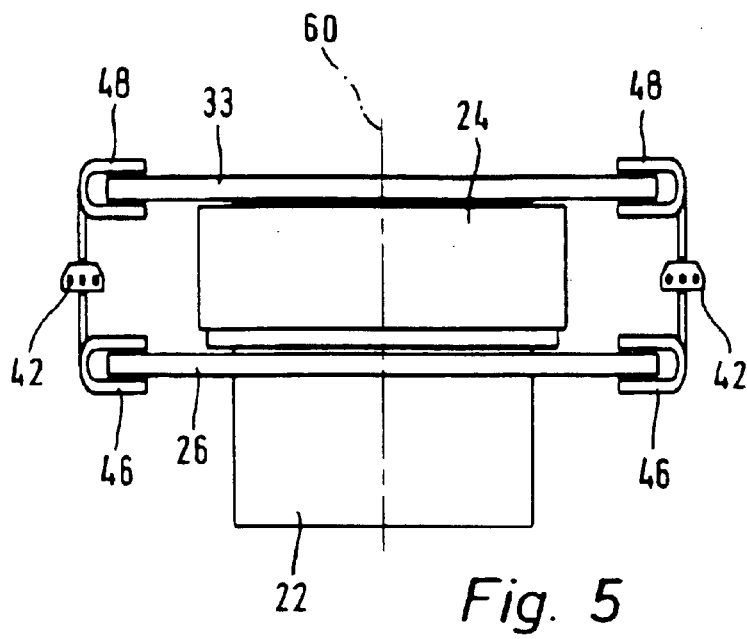
FIG. 5 shows a side view of the inventive device of FIG. 2.
Figure 6:
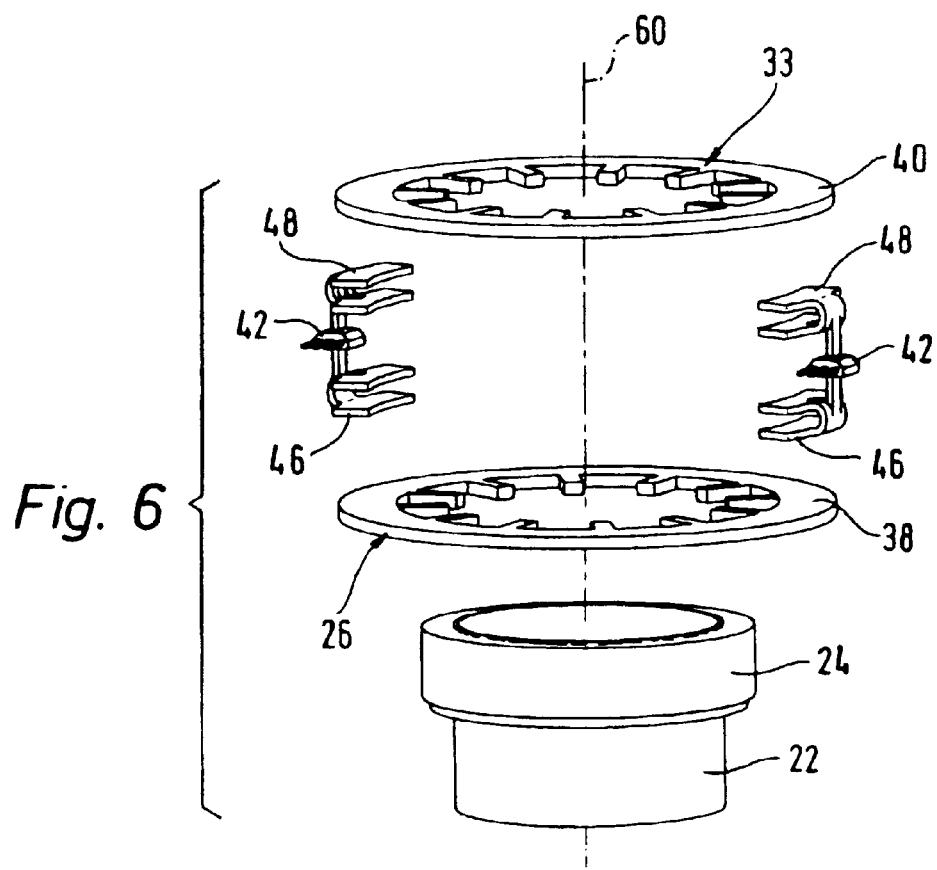
FIG. 6 shows an exploded view of the device of FIG. 5.

FIGS. 5 and 6 show the modular design of the inventive device, wherein each magnetic flux ring 38 or 40 is associated with two magnetic flux concentrators 46 and 48 which are opposite to each other relative to the longitudinal axis 60 of the steering shaft 10. In this fashion, the system is given a certain redundancy and the signal can be averaged.

Figure 7:
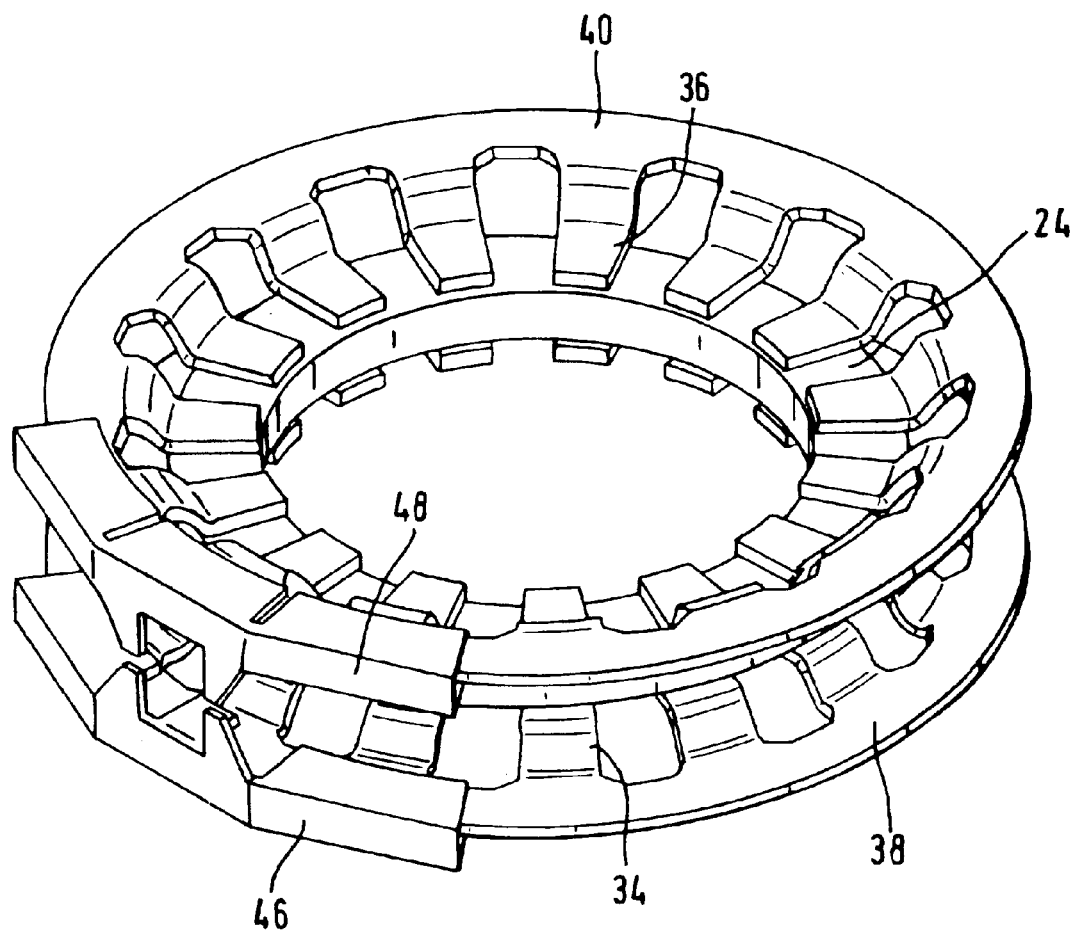
FIG. 7 shows a perspective view of a further embodiment of the invention.

In the embodiment of the inventive device shown in FIG. 7, the magnetic flux rings 38 and 40 have fingers 34 and 36 which are bent radially inwardly and in the direction towards the magnetic ring 24. This is advantageous in that the axial dimension of the magnetic ring 24 can be kept substantially smaller thereby still providing enough space between the magnetic flux concentrators 46 and 48 for receiving the magnetic field sensor. The reduced magnetic volume also reduces the overall weight of the device as well as the cost. The separation between the magnetic flux rings 38 and 40 which is still large, ensures that magnetic shunting remains small. The magnetic ring 24 may be of a sintered material, thereby increasing the field.

Figure 8:
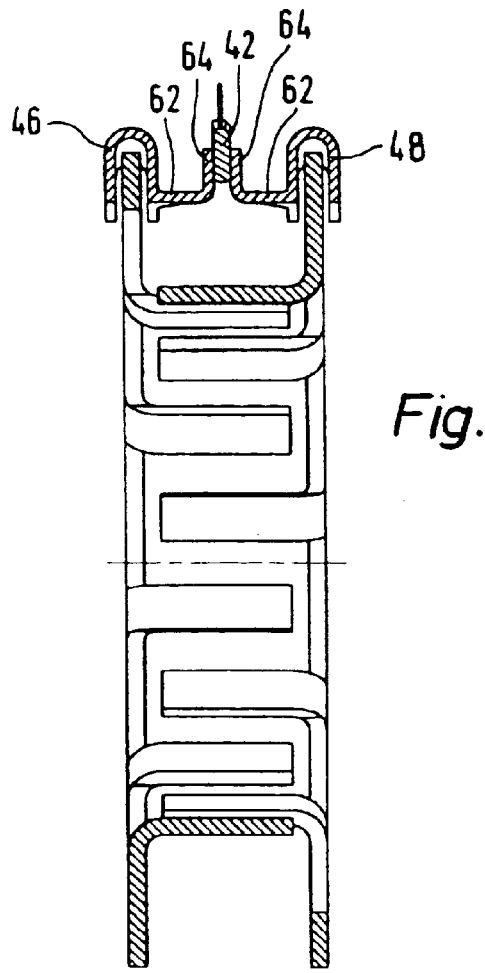
FIG. 8 shows a view of another embodiment of the inventive device of FIG. 4.

FIG. 8 shows a further embodiment of the invention, wherein the magnetic field sensor 42 is mounted between shackles 62 which project downwardly from opposing sides of the magnetic flux concentrators 46 and 48. The two shackles 62 extend approximately axially and are provided in one piece on the magnetic flux concentrators 46 and 48. The free ends 64 of the shackles 62 are radially outwardly bent and each form one abutment surface with the magnetic field sensor 42. This is substantially advantageous by providing a large region in which the magnetic field is homogeneous. Position tolerances of the magnetic field sensor 42 in a tangential and radial direction are negligible.

Figure 9:
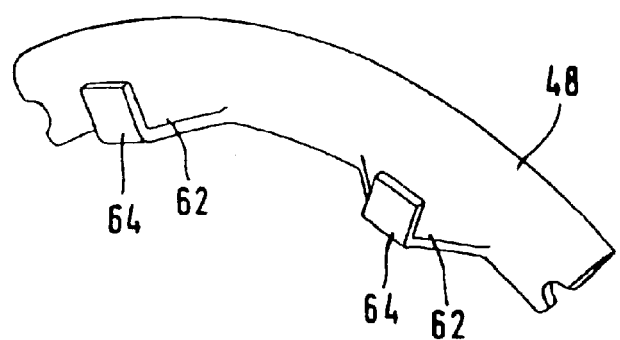
FIG. 9 shows a perspective view of a magnetic flux concentrator.

FIG. 9 shows a perspective view of a magnetic flux concentrator 48 on which the free ends 64 of the shackles 62 are formed. The surface of the free ends 64 is approximately 3×3 mm$^2$.

FIG. 4 shows the stray flux between the fingers 34 and 36 of the two magnetic flux rings 38 and 40 in the direction towards the magnetic field sensor 42 and the shackles 62. This stray field changes direction (in or out) along the periphery for each magnetic pole. Since the effective surface of the magnetic field sensor 42 is not exactly in the symmetry plane A but generally at least slightly axially offset from same, part of this stray field is detected by the magnetic field sensor 42 which modulates the signal with the number of magnetic poles.

Figure 10:
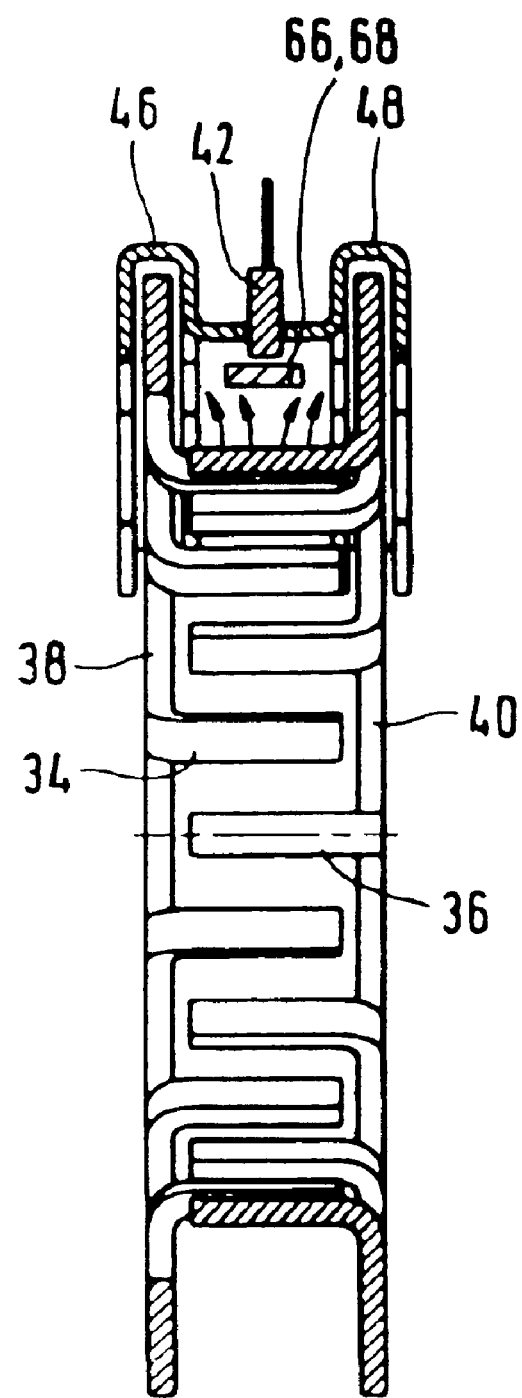
FIG. 10 shows a view of a further embodiment of the inventive device of FIG. 4.

FIG. 10 shows a shielding device 66 in the form of a shielding plate 68 which is disposed between the magnetic field sensor 42 and the fingers 34 and 36 of the two magnetic flux rings 38 and 40. The stray field acting on the magnetic field sensor 42 is thereby eliminated. The shielding plate 68 has a width which corresponds to approximately 50% of the separation between facing regions of the two magnetic flux concentrators 46 and 48. The shielding plate 68 is also bent along its length which corresponds approximately to the angular segment over which the magnetic flux concentrators 46 and 48 extend.

The influence of the stray field is also reduced via the bent free ends 64 of the shackles 62, since the magnetic field sensor 42 may thereby be placed radially further outwardly.

We claim:

1. A device for determining a torque exercised on a shaft, the shaft having a first shaft section and a second shaft section, wherein the first and second shaft sections can rotate relative to each other, the device comprising:
    a multi-pole magnetic ring, said magnetic ring surrounding and cooperating with the first shaft section;
    a stator holder mounted to the second shaft section;
    a first stator element mounted to said stator holder, said first stator element having a first magnetic flux ring and first fingers integral with and projecting from said first magnetic flux ring, said first fingers distributed uniformly over at least part of a periphery of said first magnetic flux ring at mutual separations from each other;
    a second stator element mounted to said stator holder, said second stator element having a second magnetic flux ring and second fingers integral with and projecting from said second magnet flux ring, said second fingers distributed uniformly over at least part of a periphery of said second magnet flux ring at mutual separations from each other, said second flux ring disposed at a separation from said first flux ring;
    a magnetic field sensor disposed between said first and said second flux rings;
    a first magnetic flux concentrator in magnetic communication with said magnetic field sensor, said first magnetic flux concentrator surrounding said first magnetic flux ring; and
    a second magnetic flux concentrator in magnetic communication with said magnetic field sensor, said second magnetic flux concentrator surrounding said second magnetic flux ring.

2. The device of claim 1, wherein said first and said second magnetic flux concentrators surround said first and said second magnetic flux ring in the shape of a C.

3. The device of claim 1, wherein said magnetic field sensor is disposed between said first and said second magnetic flux concentrators.

4. The device of claim 1, wherein each of said first and said second magnetic flux rings has at least two associated said first and said second magnetic flux concentrators.

5. The device of claim 4, wherein said first and said second magnetic flux concentrators are uniformly distributed over a peripheries of said first and said second magnetic flux ring.

6. The device of claim 1, wherein said first and said second magnetic flux concentrators extends over 10° to 180° of a periphery of said first and said second magnetic flux rings.

7. The device of claim 1, wherein said first and said second magnetic flux concentrators extend over in 25° to 90° of a periphery of said first and said second magnetic flux rings.

8. The device of claim 1, further comprising a stationary holder in which said first and said second magnetic flux concentrators are disposed.

9. The device of claim 8, further comprising at least one of additional electronic components, an associated circuit board, plug contacts and soldering terminals disposed in said stationary holder.

10. The device of claim 8, further comprising a sliding bearing to support said stationary holder on said stator holder.

11. The device of claim 1, further comprising a holder ring disposed at a free end of the second shaft section to which said stator holder can be attached.

12. The device of claim 11, wherein said stator holder is injection molded to said holder ring together with said first and said second stator element.

13. The device of claim 1, wherein said first and said second magnetic flux concentrators are one of a stamped metal part, a bent metal part, a sintered part, and MIM part.

14. The device of claim 1, wherein at least one of said first and said second magnetic flux concentrators has at least one shackle, which projects towards an other magnetic flux concentrator and to which said magnetic field sensor is mounted.

15. The device of claim 14, wherein said shackle projects in an axial direction from said first magnetic flux concentrator.

16. The device of claim 14, wherein each of said first and said second magnetic flux concentrators has one said shackle.

17. The device of claim 16, wherein said magnetic field sensor is disposed between said first and said second magnetic flux concentrators.

18. The device of claim 14, wherein said shackle is bent in a radial direction at a free end thereof.

19. The device of claim 18, wherein said radial direction is a radially outward direction.

20. The device of claim 18, wherein said free end of said shackle has an abutment surface for said magnetic field sensor.

21. The device of claim 1, further comprising a shielding device disposed between said first and said second fingers and said magnetic field sensor.

22. The device of claim 21, wherein said shielding device comprises a soft-magnetic shielding plate.

23. The device of claim 21, wherein said shielding device has a width of 25% to 75% of a separation between said first and said second magnetic flux concentrators.

24. The device of claim 21, wherein said shielding device is bent coaxially with respect to said first and said second stator elements.

25. The device of claim 21, wherein said shielding device extends over an angular segment which corresponds approximately to that over which said first and said second magnetic flux concentrators extend.

* * * * *